US010965633B2

(12) United States Patent
Cinar et al.

(10) Patent No.: US 10,965,633 B2
(45) Date of Patent: Mar. 30, 2021

(54) SESSION HISTORY HORIZON CONTROL

(71) Applicant: Microsoft Technology Licensing, LLC, Redmond, WA (US)

(72) Inventors: Onur Cinar, Sunnyvale, CA (US); Daniel James Chastney, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 125 days.

(21) Appl. No.: 14/499,780

(22) Filed: Sep. 29, 2014

(65) Prior Publication Data
US 2016/0094504 A1    Mar. 31, 2016

(51) Int. Cl.
*H04L 12/58* (2006.01)
*H04L 29/06* (2006.01)
(Continued)

(52) U.S. Cl.
CPC .......... *H04L 51/16* (2013.01); *G06F 3/04842* (2013.01); *G06F 3/04847* (2013.01);
(Continued)

(58) Field of Classification Search
CPC ..... H04L 51/16; H04L 51/046; H04L 65/403; H04L 12/1831; H04L 12/1822;
(Continued)

(56) References Cited

U.S. PATENT DOCUMENTS

| 6,343,313 | B1 * | 1/2002 | Salesky ................. | G06F 3/1415 709/204 |
|---|---|---|---|---|
| 7,765,267 | B2 | 7/2010 | Ryan et al. | |

(Continued)

FOREIGN PATENT DOCUMENTS

| CN | 101022481 | A | 8/2007 | |
|---|---|---|---|---|
| CN | 103051517 | * | 4/2013 | ............. H04L 12/58 |
| CN | 103051517 | A | 4/2013 | |

OTHER PUBLICATIONS

I. Paul, pcworld.com article, "How to Create and Manage Multiple User Profiles in Chrome," published Jan. 21, 2014, downloaded at https://www.pcworld.com/article/2089364/how-to-create-and-manage-multiple-user-profiles-in-chrome.html (Year: 2014).*

(Continued)

*Primary Examiner* — Eric J Yoon

(74) *Attorney, Agent, or Firm* — Schwegman Lundberg & Woessner, P.A.

(57) ABSTRACT

Session history horizon control techniques are described in which participants in a communication session are able to selectively control how much history of the communication session is shown to individuals added into the session. A representation of a session record (e.g., a message thread) may be exposed for rendering by communication modules used by participants for the communication session. Responsive to addition of participants, the communication module (s) may be configured to expose a history control element in conjunction with the session record to enable control over portions of the session record exposed to people added into the session. The history control element for a particular participant is configured to visually identify portions within the session record that are accessible to the particular participant. The history control element may also be positioned in different locations in the session record to modify exposure of the messages to the particular participant.

19 Claims, 10 Drawing Sheets

(51) Int. Cl.
*G06F 3/0484* (2013.01)
*H04L 12/18* (2006.01)

(52) U.S. Cl.
CPC ........ H04L 12/1831 (2013.01); H04L 51/046 (2013.01); H04L 65/403 (2013.01)

(58) Field of Classification Search
CPC ..... H04L 51/04; H04L 51/14; H04L 12/1813; G06F 3/04842; G06F 3/04847; G06F 40/117
See application file for complete search history.

(56) References Cited

U.S. PATENT DOCUMENTS

| | | | |
|---|---|---|---|
| 8,682,980 | B2 | 3/2014 | Fernandez et al. |
| 8,751,572 | B1 | 6/2014 | Behforooz et al. |
| 8,825,778 | B2* | 9/2014 | DeLuca .................. H04L 51/16 709/204 |
| 2003/0023684 | A1 | 1/2003 | Brown et al. |
| 2006/0212583 | A1 | 9/2006 | Beadle et al. |
| 2008/0141146 | A1 | 6/2008 | Jones et al. |
| 2008/0184167 | A1* | 7/2008 | Berrill ..................... G06F 3/048 715/833 |
| 2009/0172111 | A1 | 7/2009 | Jones |
| 2009/0319941 | A1* | 12/2009 | Laansoo ........... G06F 17/30551 715/784 |
| 2011/0119337 | A1* | 5/2011 | Bishop ................. G06Q 10/107 709/206 |
| 2012/0016944 | A1* | 1/2012 | Curry ................... H04L 12/581 709/206 |
| 2012/0173632 | A1* | 7/2012 | Chakra ................ G06Q 10/107 709/206 |
| 2013/0185363 | A1 | 7/2013 | Deluca et al. |
| 2003/0339431 | | 12/2013 | Yannakopoulos et al. |

OTHER PUBLICATIONS

Burgess, B., "How to Add Comments to Documents in Word 2010," published Aug. 26, 2010, downloaded from https://www.howtogeek.com/howto/26867/how-to-add-comments-to-documents-in-word-2010/ (Year: 2010).*

"Second Written Opinion Issued in PCT Application No. PCT/US2015/052535", dated Aug. 23, 2016, 5 Pages.

"International Search Report and Written Opinion", Application No. PCT/US2015/052535, dated Dec. 23, 2015, 10 pages.

Erickson, et al.,' "The Design of the 'Babble' Timeline: A Social Proxy for Visualizing Group Activity over Time", In Proceedings: Extended Abstracts on Human Factors in Computing Systems, Mar. 31, 2001, 4 Pages.

VléGAS, et al.,' "Chat Circles", Retrieved From: <http://smg.media.mit.edu/papers/Viegas/ChatCircles/chat-circles_CHI.html> Jul. 22, 2014, Jun. 24, 2001, 12 Pages.

"International Preliminary Report on Patentability", Application No. PCT/US2015/052535, dated Jan. 2, 2017, 6 pages.

"Second Office Action and Search Report Issued in Chinese Patent Application No. 201580052820.8" (w/ Concise Statement of Relevance), dated Nov. 11, 2019, 12 Pages.

"First Office Action and Search Report Issued in Chinese Patent Application No. 201580052820.8", (w/ Concise Statement of Relevance), dated Jun. 3, 2019, 13 Pages.

"First Office Action Issued in Indian Patent Application No. 201747010128", dated Apr. 27, 2020, 6 Pages.

"Third Office Action Issued in Chinese Patent Application No. 201580052820.8", dated May 27, 2020, 17 Pages.

* cited by examiner

900

902
Output a user interface for a communication module, the user interface configured to display a history of messages exchanged between participants in a communication session established via a service provider

904
Expose a history control element via the user interface that is selectable to associate a horizion point with at least one participant, the time horizon defining portions of the history that are made available to the at least one participant

906
Obtain a selection of the horizon point for the at least one participant via interaction with the history control

908
Communicate an indication of the selected horizon point to the service provider effective to prevent the at least one participant from accessing portions of history that are not made available per the selected horizon point

Fig. 9

SESSION HISTORY HORIZON CONTROL

BACKGROUND

Users are increasingly relying upon web-based resources for conducting business and personal communications including online meetings, screen-sharing, video chats, messaging, and otherwise communicating via the Internet. Some web-based communication sessions may involve dynamically changing participants, such as when people are added to or leave a messaging thread. When participants involved in a communication sessions change, one issue that arise is how much or little of the history of the session is exposed. Conventionally, participants in a session are unable to control the exposure of history and thus each participant may be able to access the full history. In order to address situations in which participants may not want to share the full history with someone who is added into an active session, the participants may launch a new session and/or cut and paste relevant portions of the active session into the new session. Alternatively, some environments that enable communication sessions may support functionality to switch the entire history on or off with respect to participants added sometime after the start of the session. These conventional techniques involve considerable manual preparation by original participants to bring in new participants and provide limited control over the history exposure.

SUMMARY

Session history horizon control techniques are described in which participants in a communication session, such as an online chat, are able to selectively control how much history of the communication session is shown to individuals added into the session. A history of messages exchanged between participants in a communication session is captured to create a session record. A representation of the session record (e.g., a message thread) may be exposed for rendering by communication modules used by participants for the communication session. Responsive to addition of participants, the communication module(s) may be configured to expose a history control element in conjunction with the session record to enable a session initiator (or other participants) to control which portions of session record get exposed to people added into the session after some communication has already occurred. In an implementation, the history control element for a particular participant is configured to visually identify portions within the representation of the session record which the particular participant is able to access. The history control element may be positioned in different locations within the representation of the session record to modify exposure of the messages to the particular participants.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the following discussion.

FIG. 9 is a flow diagram depicting an example procedure to select a history horizon for a participant via a history control element in accordance with one or more implementations.

DETAILED DESCRIPTION

Overview

Figure 1:
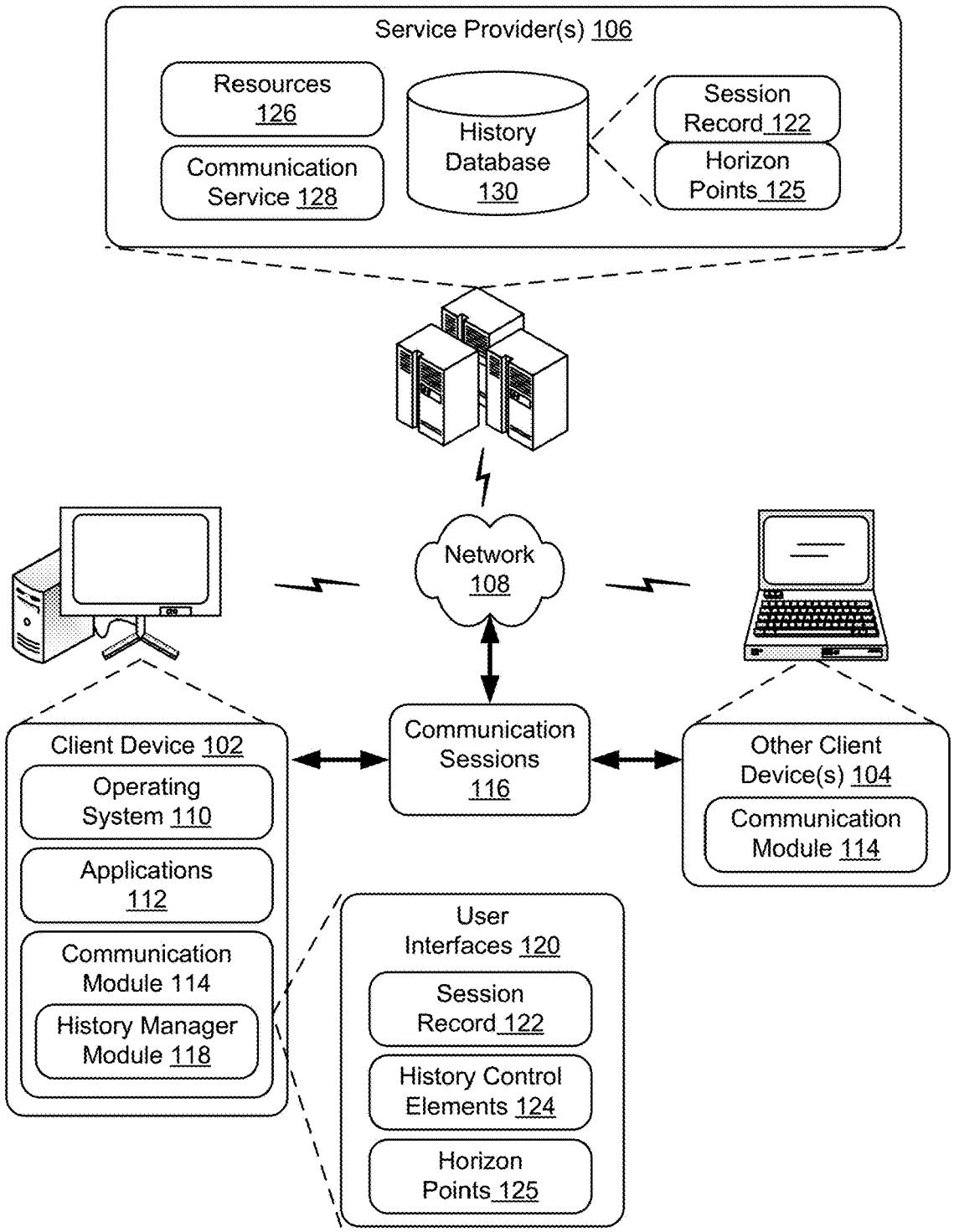
FIG. 1 is an illustration of an example operating environment that is operable to employ techniques for session history horizon control.

Conventionally, participants in a chat session are unable to control the exposure of history and thus each participant may be able to access the full history. Thus, users may be forced to initiate a separate session to prevent some participants from seeing sensitive or private information in messages exchanged before the participants were added into the conversation.

Session history horizon control techniques are described in which participants in a communication session, such as an online chat, are able to selectively control how much history of the communication session is shown to individuals added into the session. A history of messages exchanged between participants in a communication session is captured to create a session record. A representation of the session record (e.g., a message thread) may be exposed for rendering by communication modules used by participants for the communication session. Responsive to addition of participants, the communication module(s) may be configured to expose a history control element in conjunction with the session record to enable a session initiator (or other participants) to control which portions of session record get exposed to people added into the session after some communication has already occurred. The history control element for a particular participant is configured to visually identify portions within the representation of the session record which the particular participant is able to access. For example, the history control element may be a slider, a bar, a divider, a range selector, a thumbnail image, a dial, or other user interface instrumentality that may be operable to define one or more horizon points in the session record used to control participant access to the message history. The horizon points may correspond to timestamps, locations, message ranges, message IDs, time windows or other identifiers that may be used to specify and identify portions of the session record to which participants have and do not access. In one or more implementations, the history control elements may be positioned in different locations within the representation of the session record to modify exposure of the messages to a corresponding participants. For example, a slider bar control corresponding to a particular participant may be dragged or otherwise positioned to a position before or after messages in the representation of the session record (e.g., between two chat bubbles) to designate a horizon point. Additionally, different portions of the session record may be exposed to different participants using history control element controls that are associated with each participant.

The session history horizon control techniques described herein may provide control over message exposure from directly within a representation of the session record presented via a user interface for a communication session. Moreover, visual representations of the history horizons for each participant may be shown within the representation. As such, the history controls are conveniently located and may be quickly accessed to view and modify message exposure as participants are added into a conversation. Since, a session initiator or other participant making the control decisions does not have to navigate away from a view of the messaging window to interact with history controls, the process is efficient and addition of a new participant does not significantly interrupt an on-going conversation.

In the following discussion, an example environment is first described that may employ the techniques described herein. Example details and procedures are then described which may be implemented in the example environment as well as other environments. Consequently, the example details and procedures are not limited to the example environment and the example environment is not limited to the example details and procedures. Lastly, an example system and components of the system are discussed that may be employed to implement aspects of the techniques described herein.

Example Environment

FIG. 1 is an illustration of an environment 100 in an example implementation that is operable to employ techniques described herein. The illustrated environment 100 includes a client device 102, an other client device 104, and a service provider 106 that are communicatively coupled via a network 108. The client device 102, other client device 104, and service provider 106 may be implemented by one or more computing devices and also may be representative of one or more entities.

A computing device may be configured in a variety of ways. For example, a computing device may be configured as a computer that is capable of communicating over the network 108, such as a desktop computer, a mobile station, an entertainment appliance, a set-top box communicatively coupled to a display device, a wireless phone, a game console, and so forth. Thus, the computing device may range from full resource devices with substantial memory and processor resources (e.g., personal computers, game consoles) to a low-resource device with limited memory and/or processing resources (e.g., traditional set-top boxes, hand-held game consoles). Additionally, although a single computing device is shown in some instances, the computing device may be representative of a plurality of different devices, such as multiple servers of the service provider 106 utilized by a business to perform operations, and so on. Further examples of computing systems and devices suitable to implement techniques described herein are described below in relation to FIG. 10.

Although the network 108 is illustrated as the Internet, the network may assume a wide variety of configurations. For example, the network 108 may include a wide area network (WAN), a local area network (LAN), a wireless network, a public telephone network, an intranet, a peer-to-peer network, and so on. Further, although a single network 108 is shown, the network 108 may be configured to include multiple networks.

The client device 102 is further illustrated as including an operating system 110. The operating system 110 is configured to abstract underlying functionality of the underlying device to applications 112 that are executable on the client device 102. For example, the operating system 110 may abstract processing, memory, network, and/or display functionality such that the applications 112 may be written without knowing "how" this underlying functionality is implemented. The application 112, for instance, may provide data to the operating system 110 to be rendered and displayed by a display device as illustrated without understanding how this rendering will be performed. A variety of applications 112 typically associated with client devices are contemplated including, but not limited to, a productivity suite that integrates multiple office productivity modules, a web browser, games, a multi-media player, a word processor, a spreadsheet program, a photo manager, and so forth.

The client device 102 and other client device 104 are each illustrated as including a communication module 114. The communication modules are representative of functionality to enable various kinds of communications via the network 108. Examples of the communication modules include a browser to access web content, a voice communication application (e.g., a VoIP client), a video communication application, an instant messaging application, a content sharing application, and combinations thereof. The communication module 114 for instance, enables different communication modalities to be combined to provide diverse communication scenarios. This includes but is not limited to implementing integrated functionality for web browsing, user presence indications, video communications, online collaboration and meeting experiences, instant messaging (IM), and voice calling. Further, the communication module may be operable to access online resources (e.g., content and services), browse web pages and sites, establish communication connections with service providers and other clients, and so forth. In at least some implementations, the communication module 114 represents an application that is deployed to and installed locally on a client device. Additionally or alternatively, the communication module 114 may be implemented all or in part as a remote application that is accessed and executed via a web browser (e.g., a web application), as a remote service from a provider, using peer-to-peer techniques, and so forth.

In accordance with techniques described herein, the communication module 114 may be used to establish communication sessions 116 between endpoints such as between a service provider and one or more clients and/or directly between clients. For example, communication sessions 116 may enable exchange of various messages, media streams (e.g., audio/video), content, and so forth between endpoints as represented in FIG. 1. In one or implementations, communication sessions 116 represent web-based real-time communication that occurs using communication modules 114 that may be configured as web browsers, cloud-based web applications, client applications, or otherwise.

The client device 102 may include a history manager module 118 configured to implement techniques for session history horizon control as described herein. As illustrated, the history manager module 118 may be implemented as a component of another application, such as being an integrated component of a browser or other communication module 114. In addition or alternatively, the history manager module 118 may be provided as a standalone module that various applications 112 may make use of to control exposure of information exposed in communication sessions 116 as described herein.

As further represented in FIG. 1, a user interface 120 may be output via a communication module 114 to render a view of content associated with communication sessions 116. The user interface 120 that is configured to include a plurality of elements, examples of which include a representation of a session record 122 and history control elements 124. The session record 122 represent records of interaction between participants during the communication sessions 116, such as instant messages exchanged in an instant message session, a video of an on-line meeting, an audio transcription of a voice call, an so forth. The session records 122 may be stored locally at the client. In addition or alternatively, session records 122 may be upload to and stored by a service provider 106 as described in more detail below. Clients joined in a communication session may then be able to access and render some or all portions of the session record 122 via user interfaces associated with respective communication modules 114. A user interface 120 may be configured in various ways to present the session record 122, such as by showing a message thread for a chat session, playback of an online collaboration, and so forth.

In a common scenario, two initial participants in a session may want to add one or more new participants into a conversation. Depending upon the content of the messages already exchanged and the people being added in, the initial participants may or may not want to share the history of the session with the new participants. The history control elements 124 provide a mechanism for visualization and adjustment of portions of the session record 122 that are concealed from and exposed to different participants.

In particular, history control elements 124 are representative of various functionality that may be provided to enable control over the portions of a session record 122 that are made accessible to participants in a session. For example, a history control element may be configured in various ways to designate horizon points 125 for participants on an individual basis (e.g., participant-by-participant) that designate portions of the session record that are exposed and concealed from the participants. The horizon points 125 may correspond to timestamps, locations, message ranges, message IDs, time windows, message groups, workflow tasks, categories, and/or other identifiers in the session record that may be used to specify and identify portions of the session record to which participants have and do not access. The horizon points 125 may be communicated along with the session record 122 to the service provider 106 to enable the service provider 106 to control exposure of the history to participants in accordance with the horizon points 125.

By way of example, a history control element 124 may configured as a slider, a bar, a divider, a range selector, a thumbnail image, a dial, or other user interface instrumentality that may be operable to define one or more horizon points 125 in the session record. In another example, a history control element 124 may be configured to launch a history control dialog that may include visualizations of disclosure horizons for multiple participants may be presented and/or settings to control participant access to session history.

Different history control elements 124 may be associated with different participants in a session to enable individualized control. In one or more implementations, a history control element 124 associated with a particular participant is configured to visually identify portions within a representation of the session record 122 which the particular participant is able to access. In addition or alternatively, the history control element 124 may be positioned in different locations within the representation of the session record 122 to modify exposure of the messages to the particular participants. Thus, different portions of the session record 122 may be exposed to different participants via respective history control elements.

In one or more implementations, a session initiator or owner (e.g., a participant who initiates the session) may have primary control over the disclosure of the history to other participants. The session initiator may also be able to grant the ability to control the history to other participants, such as by making a selection to enable history control for one or more participants initially invited to join an on-line session. For participants that have control over one or more other participants, history control elements 124 may be exposed responsive to addition of new participants to visually represent and/or control the portions of history that are exposed. Some illustrative examples of history control elements 124, as well as detail regarding techniques for session history control, are provided in relation to the following figures.

The service provider 106 as depicted in FIG. 1 includes functionality operable to manage various resources 126 that may be made available over the network 108. For example, service provider 106 may provide various resources 126 via webpages or other user interfaces that are communicated over the network for output by one or more clients via a web browser or other client application. The service provider 106 is configured to manage access to the resources 126, performance of the resources, and configuration of user interfaces to provide the resources 126, and so on. The service provider 106 may represent one or more server devices used to provide the various resources 126.

Generally, resources 126 made accessible by a service provider 106 may include any suitable combination of services and/or content typically made available over a network by one or more providers. Some examples of services include, but are not limited to, a search service, an email service, an instant messaging service, an online productivity suite, and an authentication service to control access of clients to the resources 126. Content may include various combinations of text, multi-media streams, documents, application files, photos, audio/video files animations, images, web pages, web applications, device applications, content for display by a browser or other client application, and the like.

One particular example of a resource that may be accessible via the service provider is a communication service 128 as represented in FIG. 1. The communication service 128 is representative of a service to perform various tasks for management of communications sessions 116 and interactions between the client device 102 and other client device 104. The communication service 128, for instance, may be operable to manage initiation, moderation, and termination of communication sessions 116 for the clients. The communication service 128 may integrate functionality for one or more of VoIP calls, online meeting and conferencing, screen sharing, a unified communications and collaboration (UC&C) service, instant messaging, video chats, and so forth. The communication service 128 may also be implemented as or be connected to a private branch exchange (PBX) in communication with a Public Switched Telephone Network ("PSTN") to enable voice communication between the client terminal and other devices.

The communication service 128 also represents functionality to implement server-side aspects of techniques for session history control as discussed above and below. For example, the communication service 128 may be configured to include or otherwise make use of a history database 130 for communication sessions 116. In particular, the history database 130 may be configured to store session records 122 and horizon points 125 generated by clients and communicated through the communication service 128. The communication service 128 may interact with clients to capture the history of communications between the clients, which are reflected by the session records stored in the history database. Thus, in addition to facilitating the communications sessions 116, the communication service 128 service may be configured to maintain the history database 130 and also to control access to the session records 122 in accordance with the horizon points 125.

Having considered the foregoing example environment, consider now a discussion of some further details and user interfaces for session history horizon control in accordance with one or more implementations.

Example Session History Horizon Control Details and User Interfaces

To further illustrate techniques that may be employed to control history disclosure for communication sessions on a per-participant basis, consider now a discussion of some user interface examples and scenarios that are depicted in FIGS. 2-7. In general, functionality, features, and concepts described in relation to the examples above and below may be employed in the context of the example procedures described later in this document. Further, functionality, features, and concepts described in relation to different figures and examples in this document may be interchanged among one another and are not limited to implementation in the context of a particular figure or procedure. Moreover, blocks associated with different representative operations, procedures, and individual figures herein may be applied together and/or combined in different ways. Thus, individual functionality, features, and concepts described in relation to different example environments, devices, components, and procedures herein may be used in any suitable combinations and are not limited to the particular combinations represented by the enumerated examples in this description.

Figure 2:
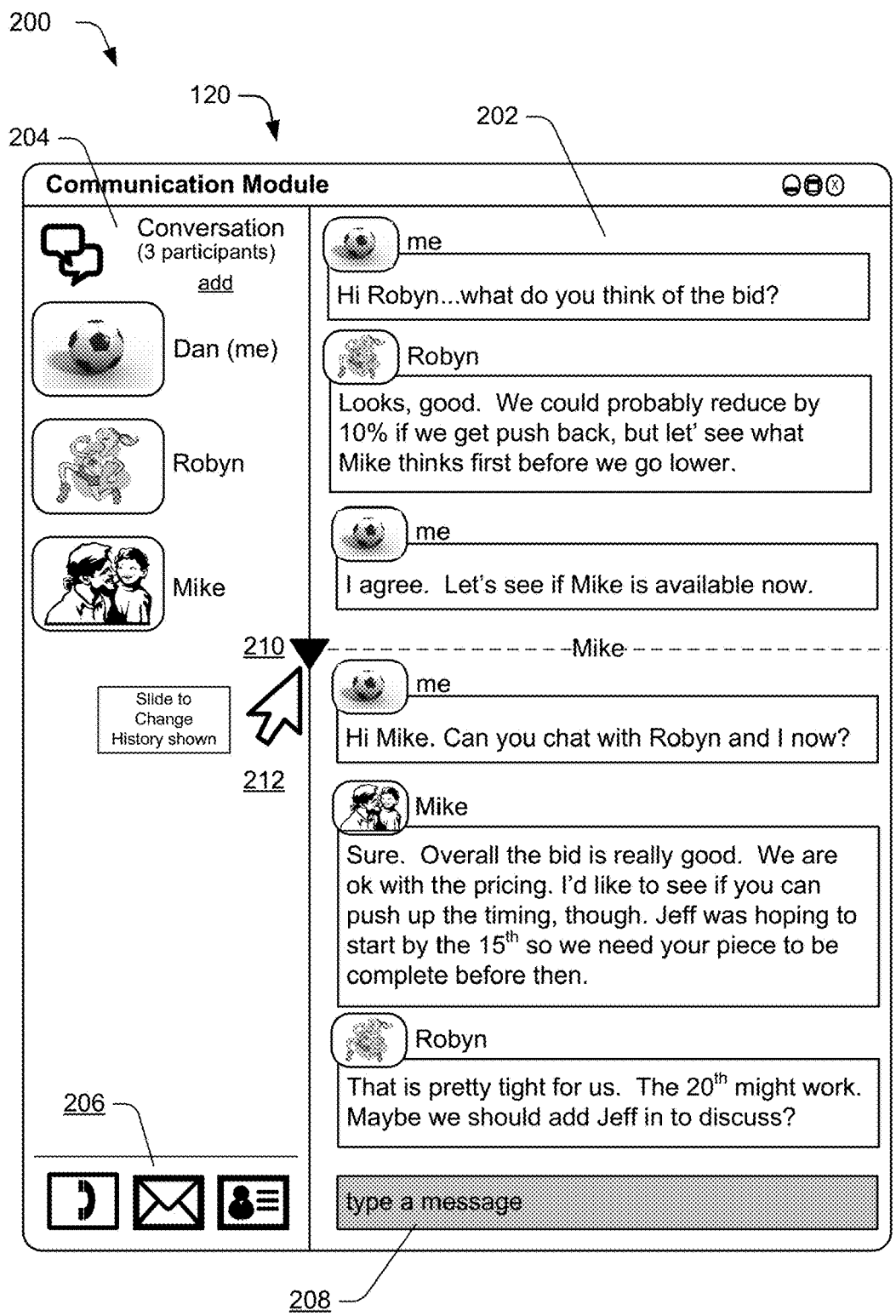
FIG. 2 is a diagram depicting some details of a user interface having a history control element in accordance with one or more implementations.

FIG. 2 depicts generally at 200 a diagram depicting a representative user interface 120 associated with a communication module 114 as described herein. The example user interface 120 includes a session display portion 202 that is representative of an application frame, window, or other portion in which a representation of a session record 122 may be presented. Here, the session display portion 202 presents a message thread between participants in an instant messaging session. The example user interface 120 also includes a session information portion 204 which may be configured to provide information regarding participants in the session, controls to manage the session, and so forth. The session information portion 204 may also provide menus, controls, buttons, and other user interface instrumentalities that provide core functionality of the communication module 114. In the depicted example, the session information portion 204 shows visual representations of three participants engaged in the instant messaging session including profile pictures and names. The session information portion 204 may also provide functionality to add participants to or remove participants from the conversation. Profile information, contact information, and/or other details for participants may also be made accessible via the session information portion 204 through interaction with the representations, such as by clicking upon, hovering a cursor proximate to, selecting, or otherwise interacting with the representations.

As noted, a communication module 114 may be configured to provide integrated functionality for web browsing, user presence indications, video communications, online collaboration and meeting experiences, instant messaging, and voice calling. This is represented at least in part by the links portion 206, which in the illustrated example includes icons representative of functionality selectable to initiate a phone call, send an email message, and access contacts. The user interface 120 may also provide functionality to facilitate communications during the session. For example, a message input box 208 is depicted in FIG. 2 that is configured to enable input of instant messages for communication to participants in the session.

In accordance with techniques described herein, one or more history control elements 124 as discussed previously may be exposed in the user interface 120 to facilitate control over exposure of the session record to participants. In one or more implementations, the history control elements 124 are configured to provide visualizations and/or control of horizon points 125 for participants directly from within a representation of the session records, such as in the example session display portion 202. History control elements 124 may be made accessible in the user interface in various ways. For example a control associated with a participant may be selectively exposed to a session initiator and/or other existing participants responsive to addition of the participant into the session. History control elements 124 may also be provided as persistently rendered controls, as selectable menu items, by clicking on participant representations in the session information portion 204, or otherwise. In an implementation, access to messages exchanged prior to a participant joining the conversation are restricted based on a configurable default setting so that privacy is maintained in the absence of selections to reveal the history. In at least some implementations, history control elements 124 may be repositioned to different locations with the representation of a session record to specify horizon points for a participant and change the participant's access to the history accordingly. Repositioning may occur in various ways, such as by a select and drag operation, sliding the control, clicking to select the control and then selecting a new position, highlighting of one or more groups of messages, and so forth.

In the represented scenario, an example history control element 124 in the form of a slider bar control 210 is shown as being associated with a participant "Mike". A variety of other configurations of example history control elements are also contemplated, examples of which include but are not limited to a dial selector, a message range selector, a thumbnail view of the session record that enables selections to set history points, or a history dialog, to name a few. Here, the slider bar control 210 is positioned at a point in the session record at which Mike joined the conversation. This initial position may be set automatically by default responsive to adding Mike as a participant. The slider bar control 210 is configured to designate a timestamp, message ID, or other horizon point 125 that controls which of the messages in the session record are accessible to Mike.

Here, the example slider bar control 210 visually represents a division between messages that are made accessible to Mike and those that are not. In particular a dashed line extends across the session display portion 202 between messages at a position corresponding to a horizon point 125 established when Mike was invited to and/or joined the conversation. The horizon point 125 may be defined according to a timestamp and/or a particular message identifier. The slider bar control 210 is also labeled with Mike's name to indicate the association of the bar to Mike.

In this example, Mike has access to messages below the slider bar control 210 that correspond to exchanges occurring after Mike joined, but does not have access to messages above the slider bar control 210 that occurred prior to Mike joining. The session initiator, "Dan" or "me" in this example, and/or "Robyn" who were engaged in the prior conversation may decide whether or not to reveal some or all of the history to Mike and operate the slider bar control 210 to reposition the control and change the horizon point 125 if they so choose. For instance, interaction 212 may occur with the slider bar control 210 to modify the position, adjust corresponding horizon points, and accordingly change Mike's access to the message history. In the example shown, hovering of a cursor proximate to the slider bar control 210 is shown which causes a notification to appear that indicates "Slide to Change History Shown." Sliding the slider bar control 210 upwards or otherwise repositioning the control to an earlier point in the session record may reveal additional history to Mike. Similarly, sliding the slider bar control 210 downward or otherwise repositioning the control to a later point may conceal more of the history reflected by the session record.

It should be noted that the example user interface 120 shown in FIG. 2 corresponds to a view that may be provided to the initial participants (e.g., Dan and Robyn). Since a communication module 114 employed by Mike for the session may have access only to some of the history, Mike's view may be different. In particular, Mike's view may include just the three messages below the slider bar control 210 after Mike joined. Additionally, Mike's view may not include the slider bar control 210 since Mike does not have control over his own access. Thus, different views may be exposed to different participants based on their level of access and/or associated horizon points in accordance with techniques described above and below.

Figure 3:
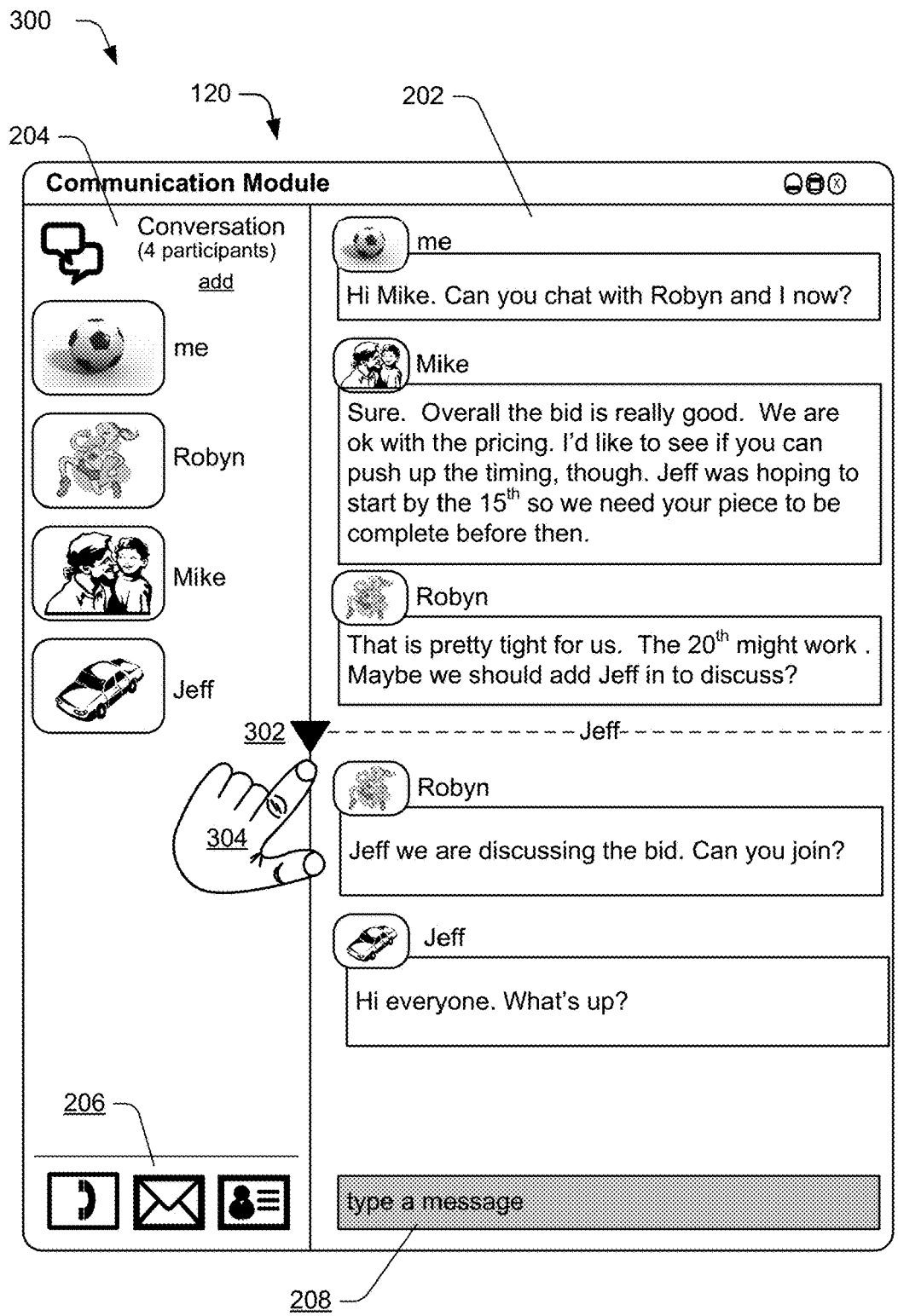
FIG. 3 is a diagram depicting some additional details of a user interface having a history control element in accordance with one or more implementations.

FIG. 3 depicts generally at 300 a diagram depicting the representative user interface 120 of FIG. 2 showing addition of another participant "Jeff." The example user interface 120 again includes the session display portion 202 which presents a continuation of message thread of FIG. 2. Prior history in the session record may be accessible by scrolling upwards, such as to return to view of FIG. 2. Here, another slider bar control 302 that is associated with Jeff is shown. The slider bar control 302 may operate to adjust horizon points 125 associated with Jeff in the same manner as the slider bar control 210 associated with Mike. For example, interaction 304 may cause repositioning of the slider bar control 302 to show more or less of the session record 122 to Jeff. Interaction 304 is represented as touch interaction in this example. Generally, history control elements 124 may be associated with individual participants, such as the sliders associated with Mike and Jeff in FIGS. 2 and 3. Moreover, history control elements 124 associated with different participants may be individually operated to set access to the history and thereby cause different views to be exposed to the different participants.

Figure 4:
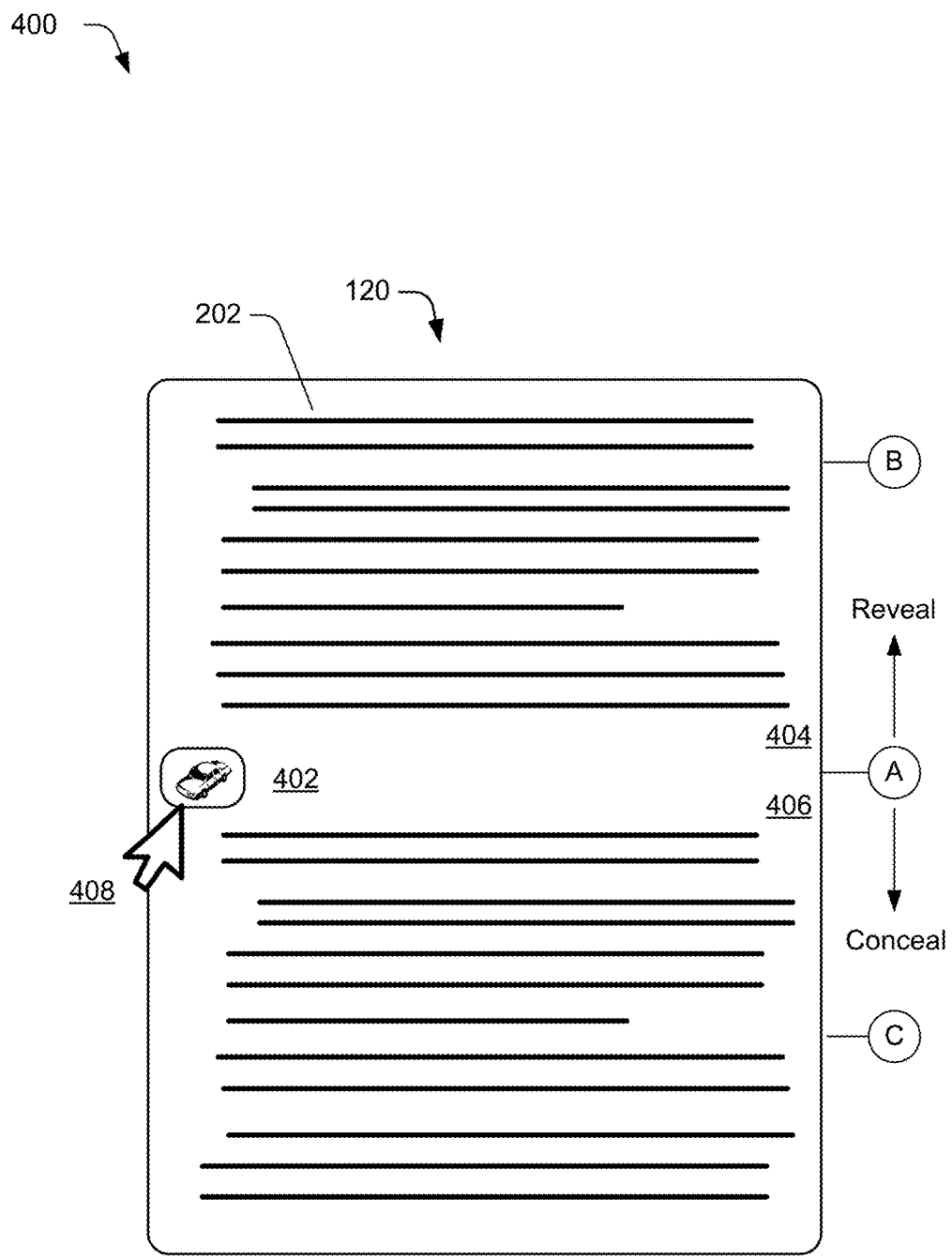
FIG. 4 is a diagram depicting a representation of a user interface having a history control element associated with a participant in accordance with one or more implementations.

FIG. 4 depicts generally at 400 a diagram of a session display portion 202 of a user interface representing operation of a history control element 124 to modify history exposed to a participant. In this example, the history element control 124 is configured as an icon 402 to visually represent an association of a horizon point 125 within the session record for a participant. The icon 402 in the depicted example corresponds to the user Jeff and include Jeff's profile picture of a car. Other configurations of icons are also contemplated, such as icons including participant names, initials, category labels, avatars, or other information suitable to identify and distinguish between participants. A dividing line such as the dashed line in FIGS. 2 and 3 may be used in conjunction with the icon 402 or may be omitted (as shown) in different implementations.

Here, the icon 402 is depicted as being positioned at a horizon point "A" within a representation of a session record 122. The portion 404 above the icon represents history which is concealed from the participant Jeff. The portion 406 represents history that is exposed to the participant Jeff. As represented, interaction 408 with the icon 402 may occur to adjust the horizon point "A" and change the history that is disclosed accordingly. For example, interaction 408 may cause repositioning of the icon 402 to the horizon point "B", such as by dragging the icon upward to horizon point "B". This repositioning reveals the additional history between points A and B to the participant Jeff. In another example, interaction 408 may cause repositioning of the icon 402 to the horizon point "C", such as by dragging the icon downward to horizon point "C". This repositioning conceals the additional history between points A and C to the participant Jeff.

Figure 5:
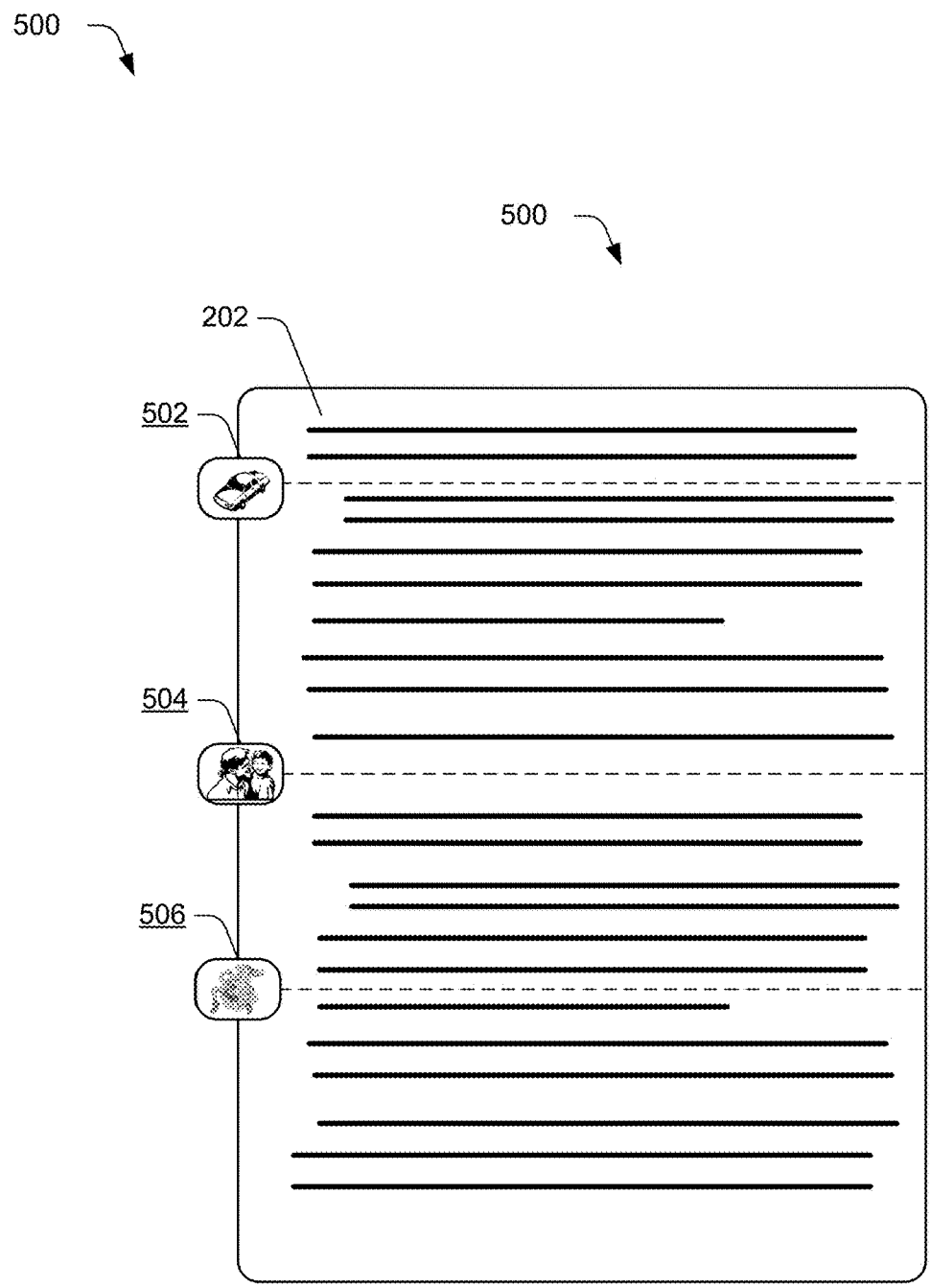
FIG. 5 is a diagram depicting a representation of a user interface having history control elements associated with multiple participants in accordance with one or more implementations.

FIG. 5 depicts generally at 500 a diagram of a session display portion 202 of a user interface 120 representing association of different history control elements 124 with multiple different participants. For example, history control elements 124 for participants Jeff, Mike, and Robyn are depicted in the form of respective icons 502, 504, and 506. In this example, the icons are combined with dashed dividing lines that extend across the representation of the session record 122 within the session display portion 202. The icons 502, 504, and 506 may be individually positioned and repositioned using various techniques described herein to set horizon points individually for corresponding participants Jeff, Mike, and Robyn participants.

Although example implementations of history element controls 124 in the form of slider bar controls and icons are discussed in relation to FIGS. 2 to 4, a variety of other configurations are contemplated. For example, other slidable or movable controls may be employed to provide visualizations of exposed history, such as avatars, text labels, comment bubbles, highlighted regions of the session record, bounding boxes, dividing bars, tabs, and/or other user interface instrumentalities associated with different participants. A toggle control may also be provided to selectively show or hide history disclosure visualizations. In one or more implementations, multiple different non-contiguous portions of the session history may be selected or deselected for exposure to a particular participant, such that some exposed portions of the history may be non-sequential with other exposed portions and/or some restricted portions of the history may be non-sequential with other restricted portions. Non-contiguous portions may be designated for a participant using multiple sliders, a range selector control operable to highlight multiple portions of the session record and/or groups of messages, a set of start and end dividing lines that may be placed throughout a representation of the session record, and so forth.

Functionality to designate individual messages or portions of a session record as restricted may also be provided. For example, check boxes, toggles, switches, or settings controls associated with individual messages may be exposed in a user interface 120 and used to set restricted or unrestricted statuses on a message by message basis. Indications of the status of messages may be conveyed to the service provider to prevent exposure of the restricted messages to corresponding participants. Selections to restrict individual messages may be employed in addition to selection of horizon points to specify time windows and/or groups of messages that are exposed and concealed. Thus, access to at least some individual messages in the history outside of designated time windows or groups may be prevented based on restricted statuses of individual messages in addition to controlling access to the session record within time windows and groups formed based on the association of horizon points with participants.

In another example, a history control element 124 may be configured to launch a history control dialog configured provide visualizations of history exposed to one or more participants and functionality to modify history settings associated with the participants. In implementations, the history control dialog may be presented apart from session display portion 202 in which a representation of the session record is display such as via as pop-up window, slide-out dialog box, a different portion or frame of a user interface 120, and so forth.

Figure 6:
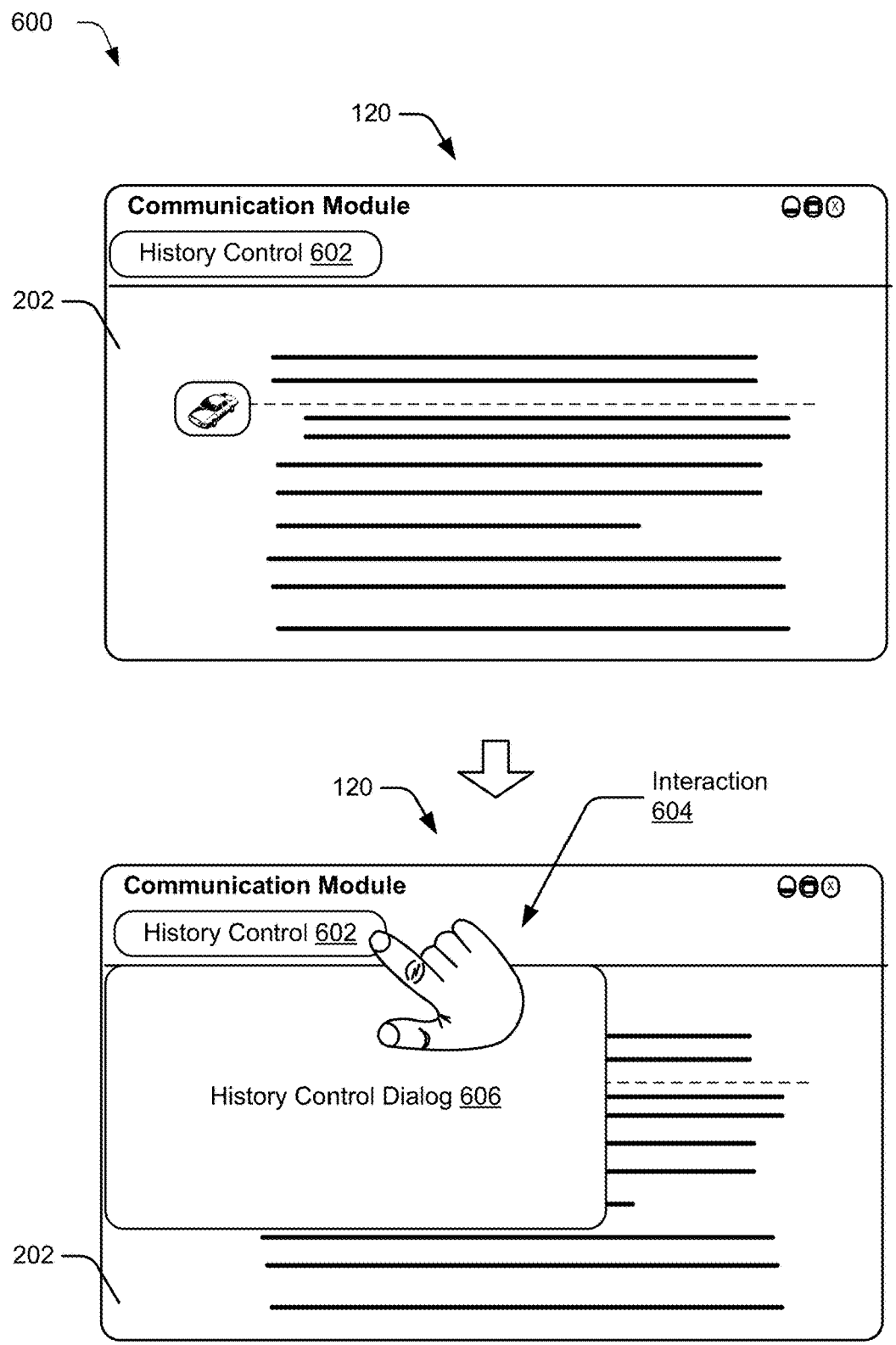
FIG. 6 is a diagram depicting a representation of a scenario in which a history control element is operable to access a history control dialog in accordance with one or more implementations.

By way of example, consider FIG. 6 which depicts generally at 600 a scenario in which a history control element is operable to access a history control dialog in accordance with one or more implementations. In particular, a history control 602 is depicted as being exposed via a user interface 120 for a communication module 114. In this example, the history control 602 is a selectable element that may be located in a header portion, a menu, sidebar, tool bar, or other portion of a user interface 120 and that may be a separate and distinct portion from the session display portion 202. As represented in FIG. 6, interaction 604 with the history control 602 causes output of a history control dialog 606 that may be configured in various way to provide control over history exposed to participants engaged in a communication session 116.

Figure 7:
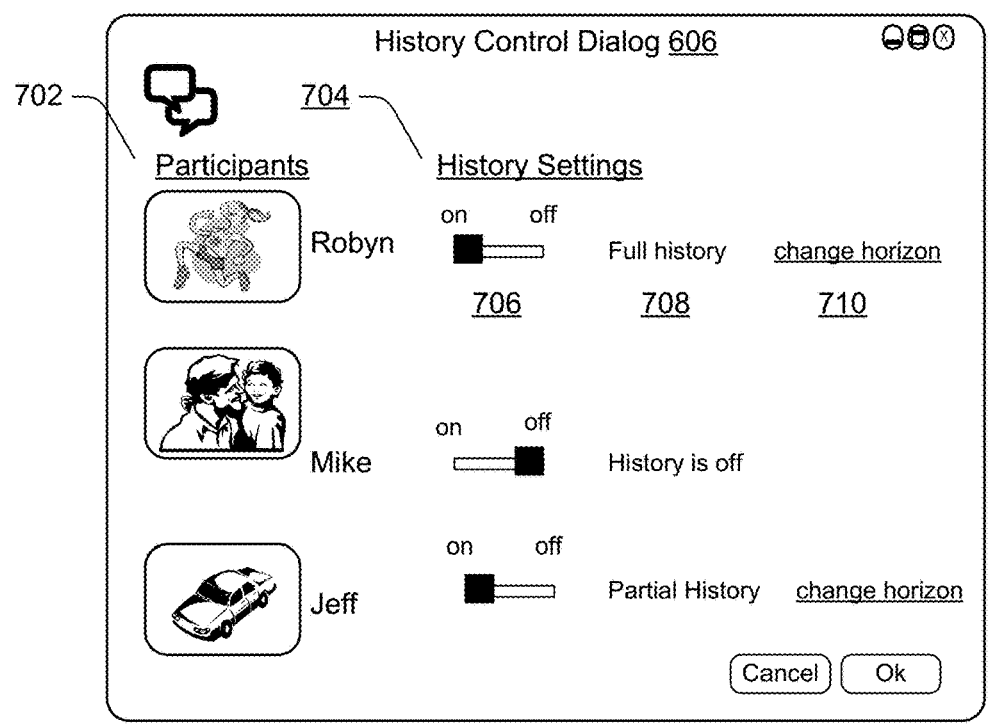
FIG. 7 is a diagram depicting details of a history control dialog in accordance with one or more implementations.

FIG. 7 is a diagram depicting generally at 700 details of an illustrative example of a history control dialog 606 in accordance with one or more implementations. In the depicted example, the history control dialog 606 is configured to represent multiple participants 702 in association with corresponding history settings 704. A variety of configurations may be employed to provide visualizations of and control over the history settings 704. Here, multiple participants 702 are listed in a grid format along with corresponding settings information and controls. By way of example and not limitation, the history settings 704 associated with each of the participants may include a toggle switch 706 or other comparable control to selectively turn access to history on or off, a description 708 to describe the current access to history (e.g., full history, history is off, partial history, etc.), and a control link 710 or other comparable element selectable to modify the settings on a per participant basis. For example, selection of the control link 710 may pull up a thumbnail view or other representation of a session record 122 through which horizon points 125 may be selected and/or modified using the techniques described herein. In another example, the control link 710 is configured to enable input of a timestamp, time window, or message id(s) to designate horizon points 125 and thereby make corresponding adjustments to the exposed history.

Having considered the foregoing example details and user interfaces, consider now a discussion of the following example procedures for media stream trust display in accordance with one or more implementations.

Example Procedures

The following discussion describes techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference may be made to the environment 100 of FIG. 1 and the examples of FIGS. 2-7. For instance, aspects of the procedures may be performed by a suitably configured computing device, such as a client device that includes or otherwise makes use of a communication module 114 and/or a history manager module 118. Aspects of the procedures may also be performed by one or more server devices, such as a servers associated with a service provider 106 configured to provide a communication service 128.

Figure 8:
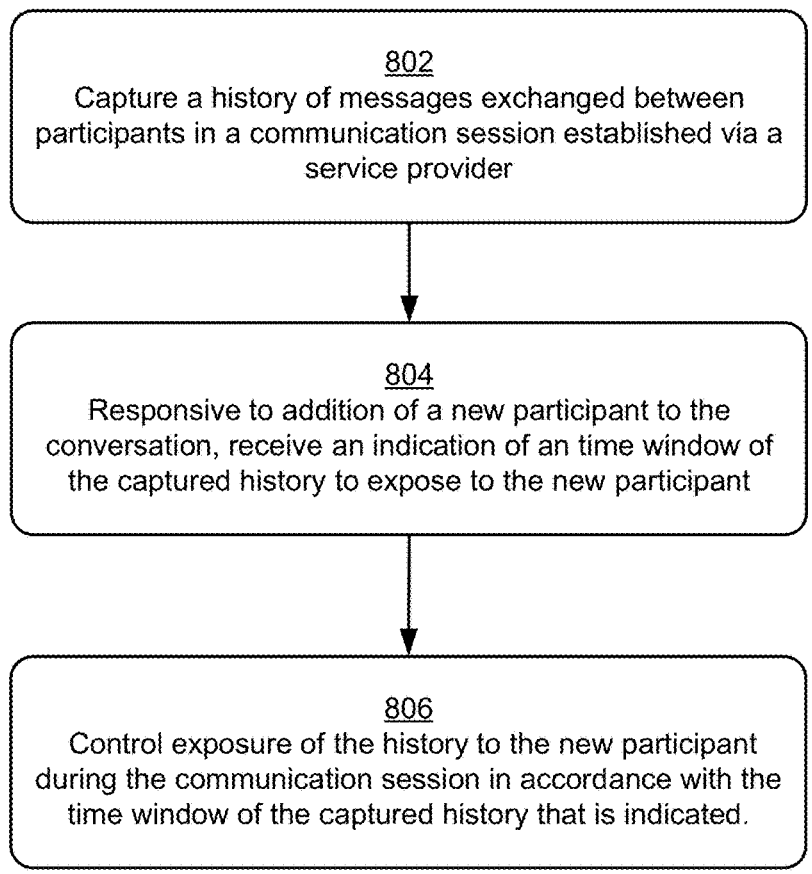
FIG. 8 is a flow diagram depicting an example procedure to control exposure to a session record in accordance with one or more implementations.

FIG. 8 is a flow diagram depicting an example procedure 800 to control exposure to a session record in accordance with one or more implementations. A history of messages exchanged between participants in a communication session established via a service provider is captured (block 802). For example, a session record 122 as described previously may be generated by a communication service 128 in connection with a communication session 116 and stored in a history database 130. The session record 122 may be employed by the communication service 128 to supply views of the session history to different clients. In accordance with techniques described herein, different views may be exposed to different clients based on association of horizon points 125 with participants in the session.

For instance, responsive to addition of a new participant to the conversation, an indication of a time window of the captured history to expose to the new participant is received (block 804). Information regarding the time window may be received by the communication service 128 based on selections made by participants in the session using history control elements 124 exposed by communication modules 114 implemented by respective client devices 102. The time window may correspond to one or more horizon points 125 that may be set and modified in various ways discussed in relation to the examples of FIGS. 1-7 above and the procedure of FIG. 9 below. Messages communicated between the communication modules 114 and the communication service 128 may be employed to convey the horizon points 125 for use by the communication service 128 to control access to the session history. Messages or other indications regarding the horizon points may be generated and communicated to the communication service 128 responsive selections that are made via a history control elements at client devices 102 associated with session participants.

By way of example and not limitation, the time window may be defined by one or more timestamps that divide the session record into portions that are exposed and portions that are not exposed to a corresponding participant. Portions may also be identified using message IDs, workflow segments or categories defined for a scripted session (e.g., a customer service chat), or other data in addition or in lieu of using timestamps. In one approach, a single timestamp may be employed to specify a point in time after which the history may be exposed to the user. In addition or alternatively, time ranges or message ranges may be employed to specify portions of the history that are exposed and portions that are not exposed.

Then, exposure of the history to the new participant is controlled during the communication session in accordance with the time window of the captured history that is indicated (block 806). For example, the communication service 128 may be configured to expose different portions of the session history to different participants of the communication session in accordance with time windows and/or other horizon points 125 established for each of the different participants. More particularly, the communication module 128 may be configured to supply data regarding the session history to client communication modules that is sufficient to enable formation of user interfaces for the communication session 116 that include individualized views of the history that are restricted to the time windows and/or other horizon points 125 specified for different participants. In order to do so, the communication service may parse the session records 122 to ascertain portions of the history designated as restricted for each participant based on corresponding horizon points 125. Then, the communication service 128 may configure a modified session record for communication to communication modules associated with each participant that omit the portions of the history designated as restricted.

In the absence of an explicit selection indicative of the time window for a participant, the communication service 128 may prevent access to the history by default in accordance with a configurable default setting. This may occur by setting a horizon point 125 to a timestamp that corresponds to a point in time at which the participant joined the session by default, which prevents the participant from accessing the history of messages exchanged before participant joined. In implementations in which functionality is provided to enable designation of individual messages as restricted in addition to indicating horizon points/time windows, the communication service 128 may also control exposure to individual messages designated as restricted, even when those messages fall outside of portions defined by time window or other horizon points. Accordingly, data supplied by the communication service 128 to client communication modules may reflect session records that are modified or filtered in accordance with one or more of default settings, individual message status as restricted, or horizon points associated with participants as described herein.

FIG. 9 is a flow diagram depicting an example procedure 900 to select a history horizon for a participant via a history control element in accordance with one or more implementations. A user interface for a communication module is output that is configured to display a history of messages exchanged between participants in a communication session established through a communication service provided via a service provider (block 902). Various configurations of a user interface 120 for a communication module 114 that may provide functionality for communications session 116 of are contemplated, such as the example user interfaces 120 described in relation FIGS. 1-8. Such user interfaces may be output via respective client devices 102 corresponding to participants in the communications session. A history control element is exposed via the user interface that is selectable to associate a horizon point with at least one participant of said participants, the horizon point defining portions of the history that are made available to the at least one participant (block 904). For example, a communication module 114 may be configured to include or make use of a history manger module 118 that is configured to selectively expose history control elements that may be used to control history of a session that is exposed to participants. Various configurations of history control elements 124 are contemplated, examples of which are described throughout the preceding discussion of FIGS. 1-8. For example, the history control element may be configured as a slider bar control associated the participant that is exposed in the user interface in connection with a representation of a session record that reflects the history. The slider bar control may be configured to be positioned at a location within the session record to indicate a point in the session record after which the history is made accessible to the participant. In another example, the history control element is operable to launch a history control dialog configured to enable toggling of the availability of history on or off for participants in the communication session and/or selections of horizon points to associate with the participants, as discussed in relation to FIGS. 6 and 7. In yet another example, the history control element may be configured as a range control selector operable to specify horizon points by selection of one or more groups of messages displayed in the user interface, such as by highlighting different portions, positioning dividers, selections of individual messages or message groups, or otherwise. Other types of history control elements are also contemplated.

A selection of the horizon point for the at least one participant via interaction with the history control element is obtained (block 906), and then an indication of the selected horizon point is communicated to the service provider that is effective to prevent the at least one participant from accessing portions of history that are not made available per the selected horizon point (block 908). For example, the history manger module 118 may be further configured to monitor interaction with a history control element 124 and recognize selections for history points 125 that are made via the history control element 124. The history manger module 118 may form indications regarding the history point for communication to a communication service 128 of a service provider 106. In an implementation, messages configured to indicate time windows, timestamps, message ids, or other indications of horizon points may be generated responsive to interaction with a history control element 124 and sent to the communication service 128 to enable history control by the service. For example, a message may be configured to convey a timestamp associated with a participant to the communication service 128 that indicates a time in the session after which the history is made accessible to the participant. The communication service 128 may then control which portions of the history are exposed to the participant based on the timestamp in accordance with techniques discussed herein.

Having considered some example procedures, consider now a discussion of an example system and devices that may be employed to implement aspects of the techniques described herein in one or more implementations.

Example System and Device

Figure 10:
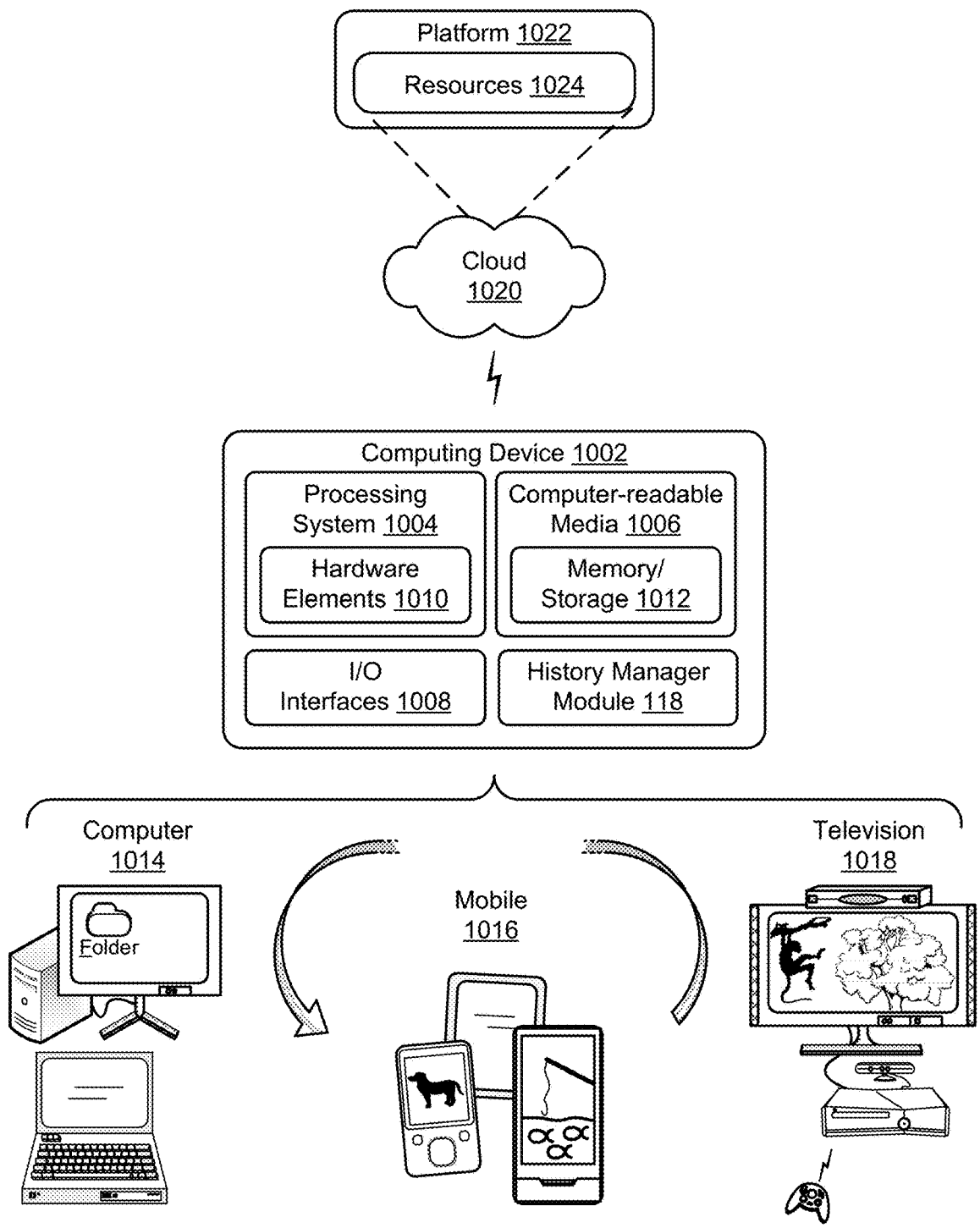
FIG. 10 illustrates an example system having devices and components that may be employed to implement aspects of the techniques described herein.

FIG. 10 illustrates an example system generally at 1000 that includes an example computing device 1002 that is representative of one or more computing systems and/or devices that may implement the various techniques described herein. The computing device 1002 may be, for example, a server of a service provider, a device associated with the client (e.g., a client device), an on-chip system, and/or any other suitable computing device or computing system.

The example computing device 1002 as illustrated includes a processing system 1004, one or more computer-readable media 1006, and one or more I/O interfaces 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware elements 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1006 is illustrated as including memory/storage 1012. The memory/storage 1012 represents memory/storage capacity associated with one or more computer-readable media. The memory/storage 1012 may include volatile media (such as random access memory (RAM)) and/or nonvolatile media (such as read only memory (ROM), Flash memory, optical disks, magnetic disks, and so forth). The memory/storage 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 1002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "communication media."

"Computer-readable storage media" refers to media and/or devices that enable storage of information in contrast to mere signal transmission, carrier waves, or signals per se. Thus, computer-readable storage media does not include signal bearing media or signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Communication media" may refer to a signal-bearing medium that is configured to transmit instructions to the hardware of the computing device 1002, such as via a network. Communication media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules including applications 112, communication module 114, history manager module 118, communication service 128 and other program modules may be implemented as one or more instructions and/or logic embodied on some form of computer-readable storage media and/or by one or more hardware elements 1010. The computing device 1002 may be configured to implement particular instructions and/or functions corresponding to the software and/or hardware modules. Accordingly, implementation of modules as a module that is executable by the computing device 1002 as software may be achieved at least partially in hardware, e.g., through use of computer-readable storage media and/or hardware elements 1010 of the processing system. The instructions and/or functions may be executable/operable by one or more articles of manufacture (for example, one or more computing devices 1002 and/or processing systems 1004) to implement techniques, modules, and examples described herein.

As further illustrated in FIG. 10, the example system 1000 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1000, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 1002 may assume a variety of different configurations, such as for computer 1014, mobile 1016, and television 1018 uses. Each of these configurations includes devices that may have generally different constructs and capabilities, and thus the computing device 1002 may be configured according to one or more of the different device classes. For instance, the computing device 1002 may be implemented as the computer 1014 class of a device that includes a personal computer, desktop computer, a multi-screen computer, laptop computer, netbook, and so on.

The computing device 1002 may also be implemented as the mobile 1016 class of device that includes mobile devices, such as a mobile phone, portable music player, portable gaming device, a tablet computer, a multi-screen computer, and so on. The computing device 1002 may also be implemented as the television 1018 class of device that includes devices having or connected to generally larger screens in casual viewing environments. These devices include televisions, set-top boxes, gaming consoles, and so on.

The techniques described herein may be supported by these various configurations of the computing device 1002 and are not limited to the specific examples of the techniques described herein. This is illustrated through inclusion of the history manager module 118 on the computing device 1002. The functionality of the history manager module 118 and other modules may also be implemented all or in part through use of a distributed system, such as over a "cloud" 1020 via a platform 1022 as described below.

The cloud 1020 includes and/or is representative of a platform 1022 for resources 1024. The platform 1022 abstracts underlying functionality of hardware (e.g., servers) and software resources of the cloud 1020. The resources 1024 may include applications and/or data that can be utilized while computer processing is executed on servers that are remote from the computing device 1002. Resources 1024 can also include services provided over the Internet and/or through a subscriber network, such as a cellular or Wi-Fi network.

The platform 1022 may abstract resources and functions to connect the computing device 1002 with other computing devices. The platform 1022 may also serve to abstract scaling of resources to provide a corresponding level of scale to encountered demand for the resources 1024 that are implemented via the platform 1022. Accordingly, in an interconnected device embodiment, implementation of functionality described herein may be distributed throughout the system 1000. For example, the functionality may be implemented in part on the computing device 1002 as well as via the platform 1022 that abstracts the functionality of the cloud 1020.

Example Implementations

Examples implementations of session history horizon control described herein include, but are not limited to, one or any combinations of one of more of the following examples:

A method implemented by a computing device comprising: capturing a history of messages exchanged between participants in a communication session established via a service provider; responsive to addition of a new participant to the conversation, receiving an indication of a time window of the captured history to expose to the new participant; and controlling exposure of the history to the new participant during the communication session in accordance with the time window of the captured history that is indicated.

A method as described above, wherein controlling exposure of the history comprises preventing access to the history by default in the absence of an explicit selection indicative of the time window.

A method as described above, wherein controlling exposure of the history comprises supplying data regarding the history to a communication module corresponding to the new participant sufficient to enable the communication module to form a user interface for the communication session that includes the history, the data regarding the history that is supplied restricted to the time window.

A method as described above, wherein receiving the indication of the time window comprises obtaining a message from a communication module associated with one of the participants that specifies a point in time after which the history may be exposed to the user.

A method as described above, wherein the indication is generated responsive to a selection made to designate the time window via a history control element provided in a user interface for the communication session output via a communication module associated with one of the participants.

A method as described above, wherein the communication session comprises a web-based real time communication session that supports the exchange of real-time audio and video streams between the participants via respective communication modules executed by client devices associated with the participants.

A method as described above, wherein the communication session comprises an instant messaging session that supports the exchange of instant messages between the participants via respective communication modules executed by client devices associated with the participants.

A method as described above, wherein controlling exposure of the history further comprises preventing access to one or more individual messages in the history outside of the time window that are designated as restricted, the indication configured to convey the designation of the one or more individual messages as restricted in addition to indicating the time window.

A method as described in above, further comprising: parsing the history to ascertain portions of the history designated as restricted; and configuring a modified session record for communication to a communication module associated with the new participant that omits the portions of the history designated as restricted.

A method as described above, wherein controlling exposure of the history comprises exposing different portions of the history to different participants of the communication session in accordance with time windows established for each of the different participants.

A computing device comprising: a processing system; and one or more computer readable media storing instructions that, when executed by the processing system, implement a communication module configured to perform operations comprising: outputting a user interface for the communication module, the user interface configured to display a history of messages exchanged between participants in a communication session established through a communication service provided via a service provider; exposing a history control element via the user interface that is selectable to associate a horizon point with at least one participant of said participants, the horizon point defining portions of the history that are made available to the at least one participant; obtaining a selection of the horizon point for the at least one participant via interaction with the history control element; and communicating an indication of the selected horizon point to the service provider effective to prevent the at least one participant from accessing portions of history that are not made available per the selected horizon point.

The computing device as described above, wherein the history control element comprises a slider bar control associated with the at least one participant and exposed in connection with a representation of a session record that reflects the history in the user interface, the slider bar control configured to be positioned at a location within the session record to indicate a point in the session record after which the history is made accessible to at least one participant.

The computing device as described above, wherein the history control element comprises a control operable to launch a history control dialog configured to enable toggling availability of history on or off for participants in the communication session and selections of horizon points to associate with the participants.

The computing device as described above, wherein the history control element comprises a range control selector operable to specify the horizon point by selection of one or more groups of messages displayed in the user interface.

The computing device as described above, wherein communicating the indication of the selected horizon point comprises conveying a timestamp associated with the at least one participant to the communication service, the timestamp indicating a time in the session record after which the history is made accessible to at least one participant.

The computing device as described above, wherein the history control element is exposed responsive to addition of the at least one participant to the communication session.

The computing device as described above, wherein exposing the history control element comprises exposing multiple history control elements corresponding to different participants that are independently operable to control horizon points associated with corresponding participants.

One or more computer-readable storage media comprising instructions that, when executed by a client device, implement a communication module configured to perform operations comprising: initiating a communication session between two or more participants through a communication service provided via a service provider; outputting a user interface configured to facilitate exchange of messages between the two or more participants during the communication session; displaying in the user interface a representation of messages exchanged between the two or more participants; detecting when a new participant joins the communication session; and responsive to the detecting, exposing in the user interface a history control element configured to visually identify within the representation which of the messages exchanged prior to the new participant joining the communication session are exposed to the new participant and operable to selectively modify which of the messages are exposed to the new participant.

One or more computer-readable storage media as described above, wherein the history control element comprises a slider bar positioned within the representation of messages and slidable to different locations within the representation of messages to modify exposure of the messages to the new participants.

One or more computer-readable storage media as described above, wherein the communication module is configured to provide integrated functionality for web browsing, user presence indications, video communications, online collaboration and meeting experiences, instant messaging, and voice calling.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claimed subject matter.

What is claimed is:

1. A method implemented by a computing device comprising:
   capturing a chat history of chat messages exchanged between initial participants in a communication session established via a service provider;
   displaying a user interface having a session display portion, wherein the chat history is displayed within the session display portion;
   responsive to addition of a first new participant to the communication session, causing display of a first history control element via the user interface for the communication session that is output via a communication module associated with one of the initial participants, the first history control element operable to define an indication of a first time window of the captured history to expose to the first new participant, the first history control element configured to visually identify the first time window with respect to the chat history;

responsive to addition of a second new participant to the communication session, causing display of a second history control element via the user interface contemporaneously with the display of the first history control element, the second history control element operable to define an indication of a second time window of the captured history to expose to the second new participant, the second time window being different from the first time window, the second history control element configured to visually identify the second time window with respect to the chat history, wherein responsive to the additions of the first and second new participants to the communication session, the first and second history control elements are initially positioned by default at initial locations within the session display portion to indicate, respectively, that all messages in the history exchanged between the initial participants prior to the addition of the first new participant should not be exposed to the first participant and to further indicate that all messages in the history exchanged between the initial participants prior to the addition of the second new participant should not be exposed to the second participant;

moving the first and second history control elements from the initial locations to first and second locations within the session display portion, respectively, the movement of the first history control element to the first location causing an adjusting of the first time window to indicate a selection of a first set of messages from the chat history of chat messages, the movement of the second history control element to the second location causing an adjusting of the second time window to indicate a selection of a second set of messages from the chat history of chat messages, the first and second locations being different to indicate that the first and second sets of messages are different;

exposing the selected first set of messages of the history to the first new participant during the communication session in accordance with the first time window of the captured history, the exposing the selected first set of messages comprising preventing one or more messages exchanged between the initial participants prior to the first new participant joining the communication session from being exposed to the first new participant in accordance with the first time window; and exposing the selected second set of messages of the history to the second new participant during the communication session in accordance with the second time window.

2. A method as described in claim 1, further comprising obtaining a message from a communication module associated with the first new participant that specifies a point in time after which the history may be exposed to the first new participant.

3. A method as described in claim 1, wherein the communication session comprises a web-based real time communication session that supports an exchange of real-time audio and video streams between the initial participants via respective communication modules executed by client devices associated with the initial participants.

4. A method as described in claim 1, wherein the communication session comprises an instant messaging session that supports an exchange of instant messages between the initial participants via respective communication modules executed by client devices associated with the initial participants.

5. A method as described in claim 1, wherein the exposing the selected first set of messages of the history to the first new participant comprises preventing access to one or more individual messages in the history outside of the first time window that are designated as restricted, the indication of the first time window configured to convey the designation of the one or more individual messages as restricted in addition to indicating the first time window.

6. A method as described in claim 1, further comprising:
parsing the history to ascertain portions of the history designated as restricted; and
configuring a modified session record for communication to a communication module associated with the first new participant that omits the portions of the history designated as restricted.

7. The method of claim 1, wherein:
the communication session is an instant messaging session; and
the history of messages exchanged between the initial participants is a history of instant messages exchanged between the initial participants.

8. A computing device comprising:
a processing system; and
one or more computer readable storage media storing instructions that, when executed by the processing system, cause the computing device to perform operations using a communication module, the operations comprising:
outputting a user interface for the communication module, the user interface having a session display portion, the user interface configured to display, in the session display portion, a chat history of chat messages exchanged between initial participants in a communication session established through a communication service provided via a service provider;
responsive to addition of a first new participant to the communication session, causing display of a first history control element via the user interface that is selectable to associate a first horizon point with the first new participant, wherein the first horizon point defines a first time window of the chat history to expose to the first new participant;
responsive to addition of a second new participant to the communication session, causing display of a second history control element via the user interface contemporaneously with the display of the first history control element, the second history control element selectable to associate a second horizon point with the second new participant, the second horizon point being different from the first horizon point, wherein the second horizon point defines a second time window of the chat history to expose to the second new participant, the second time window being different from the first time window, wherein responsive to the additions of the first and second new participants to the communication session, the first and second history control elements are initially positioned by default at initial locations within the session display portion to indicate, respectively, that all messages in the chat history exchanged between the initial participants prior to the addition of the first new participant should not be exposed to the first participant and to further indicate that all messages in the history exchanged between the initial participants prior to the addition of the second new participant should not be exposed to the second participant;

obtaining a selection of the first and the second horizon points for the first and the second new participants via interaction with the first and second history control elements, the interaction with the first and second history control elements including moving the first and second history control elements from the initial locations to first and second locations within the session display portion, respectively;

responsive to obtaining the selection of the first horizon point, causing an adjusting of the first time window to indicate a selection of a first set of messages from the chat history of chat messages, the adjusting of the first time window further indicating that messages in the history other than the first set of messages should be not be made available to the first new participant;

responsive to obtaining the selection of the second horizon point, causing an adjusting of the second time window to indicate a selection of a second set of messages from the chat history of chat messages, the adjusting of the second time window further indicating that messages in the history other than the second set of messages should be not be made available to the second new participant wherein the first and second locations to which the first and second history control elements are moved are different to indicate that the first and second sets of messages are different;

communicating an indication of the selected first horizon point to the service provider, the communicated indication of the selected first horizon point preventing the first new participant from accessing portions of the history that are not made available based on the selected first horizon point and the adjusting of the first time window; and communicating an indication of the selected second horizon point to the service provider, the communicated indication of the selected second horizon point preventing the second new participant from accessing portions of the history that are not made available based on the selected second horizon point and the adjusting of the second time window.

9. The computing device of claim 8, wherein the first history control element comprises a slider bar control associated with the first new participant and displayed in connection with a representation of a session record that reflects the chat history in the user interface, the slider bar control configured to be positioned at a location within the session record to indicate a point in the session record after which the chat history is made accessible to the first new participant.

10. The computing device of claim 8, wherein the first and second history control elements each comprise a control operable to launch and display a history control dialog configured to enable toggling availability of history on or off for the respective first and second new participants in the communication session, the history control dialog being further configured to receive selections of the first and the second horizon points to associate with the respective first and second new participants.

11. The computing device of claim 8, wherein the first history control element comprises a range control selector operable to specify the first horizon point by selection of one or more groups of messages displayed in the user interface.

12. The computing device of claim 8, wherein the communicating the indication of the selected first horizon point comprises conveying a timestamp associated with the first new participant to the communication service, the timestamp indicating a time in a session record after which the history is made accessible to the first new participant.

13. The computing device of claim 8, wherein:
the communication session is an instant messaging session; and
the history of messages exchanged between the initial participants is a history of instant messages exchanged between the initial participants.

14. One or more computer-readable storage media comprising instructions that, when executed by a client device, cause the client device to perform operations using a communication module, the operations comprising:
initiating a communication session between two or more initial participants through a communication service provided via a service provider;
outputting a user interface configured to facilitate exchange of chat messages between the two or more initial participants during the communication session, the user interface including a session display portion;
displaying in the session display portion of the user interface a representation of a plurality of chat messages exchanged between the two or more initial participants;
detecting when a first new participant joins the communication session; and
responsive to the detecting when the first new participant joins the communication session, causing display of a first history control element in the user interface, the first history control element configured to visually identify a first time window within the representation, the first time window defining which of the plurality of messages exchanged prior to the first new participant joining the communication session are exposed to the first new participant and operable to selectively modify which of the plurality of messages are exposed to the first new participant;
detecting when a second new participant joins the communication session;
responsive to the detecting when the second new participant joins the communication session, causing display of a second history control element different than the first history control element in the user interface, the second history control element being displayed contemporaneously with the display of the first history control element, the second history control element configured to visually identify a second time window that is different from the first time window within the representation, the second time window defining which of the plurality of messages exchanged prior to the second new participant joining the communication session are exposed to the second new participant and operable to selectively modify which of the plurality of messages are exposed to the second new participant, wherein responsive to the first and second new participants joining the communication session, the first and second history control elements are initially positioned by default at initial locations within the session display portion to indicate, respectively, that all messages in the plurality of messages exchanged between the initial participants prior to the addition of the first new participant should not be exposed to the first new participant and to further indicate that all messages in the plurality of messages exchanged between the initial participants prior to the addition of the second new participant should not be exposed to the second new participant;

moving the first and second history control elements from the initial locations to first and second locations within the session display portion, respectively, the movement of the first history control element to the first location causing an adjusting of the first time window to indicate a selection of a first set of messages from the plurality of chat messages, the movement of the second history control element to the second location causing an adjusting of the second time window to indicate a selection of a second set of messages from the plurality of chat messages, the first and second locations being different to indicate that the first and second sets of messages are different;

exposing the selected first set of messages to the first new participant during the communication session in accordance with the first time window, the exposing the selected first set of messages comprising preventing one or more messages exchanged between the initial participants prior to the first new participant joining the communication session from being exposed to the first new participant in accordance with the first time window; and exposing the selected second set of messages to the second new participant during the communication session in accordance with the second time window.

15. One or more computer-readable storage media of claim 14, wherein the first history control element comprises a slider bar positioned within the representation of messages and slidable to different locations within the representation of messages to modify exposure of messages to the first new participant.

16. One or more computer-readable storage media of claim 14, wherein the communication module provides integrated functionality for web browsing, user presence indications, video communications, online collaboration and meeting experiences, instant messaging, and voice calling.

17. One or more computer-readable storage media of claim 14, wherein the first and second history control elements each comprise a control operable to launch and display a history control dialog configured to enable toggling availability of history on or off for the respective first and second participants in the communication session, the history control dialog being further configured to receive selections of horizon points to associate with the respective first and second participants.

18. One or more computer-readable storage media of claim 14, wherein the first history control element comprises a range control selector operable to specify a first horizon point by selection of one or more groups of messages displayed in the user interface.

19. The one or more computer-readable storage media of claim 14, wherein:

the communication session between the two or more initial participants is an instant messaging session; and messages in the plurality of messages exchanged prior to the first new participant joining the communication session are instant messages between the two or more initial participants.

* * * * *